Daniel Silverman
INVENTOR.

Aug. 4, 1970 D. SILVERMAN 3,523,183

METHOD AND APPARATUS FOR STORING ON AND RETRIEVING INFORMATION FROM MULTIPLE HIGH DENSITY INFORMATION STRIPS

Filed Aug. 27, 1963 4 Sheets-Sheet 2

Daniel Silverman

INVENTOR.

David Silverman
INVENTOR.

Daniel Silverman INVENTOR.

3,523,183

METHOD AND APPARATUS FOR STORING ON AND RETRIEVING INFORMATION FROM MULTIPLE HIGH DENSITY INFORMATION STRIPS

Daniel Silverman, 5969 S. Birmingham, Tulsa, Okla. 74105

Filed Aug. 27, 1963, Ser. No. 304,789
Int. Cl. G06k *17/00;* G06f *3/00*
U.S. Cl. 235—61.11 29 Claims

ABSTRACT OF THE DISCLOSURE

This invention involves an information system in which a plurality of film strips are run in a plurality of strip handlers so as to be exposed in a film gate in each handler. More than one film strip can be run sequentially in each handler. The plurality of handlers are arranged geometrically about a central scanner system that can be selectively positioned sequentially to each gate. Each of the film strips carry section index and subject index characters and each handler is adapted to read the section index and control the strip to position it to a desired section in its film gate.

Figures 1, 2, 12:
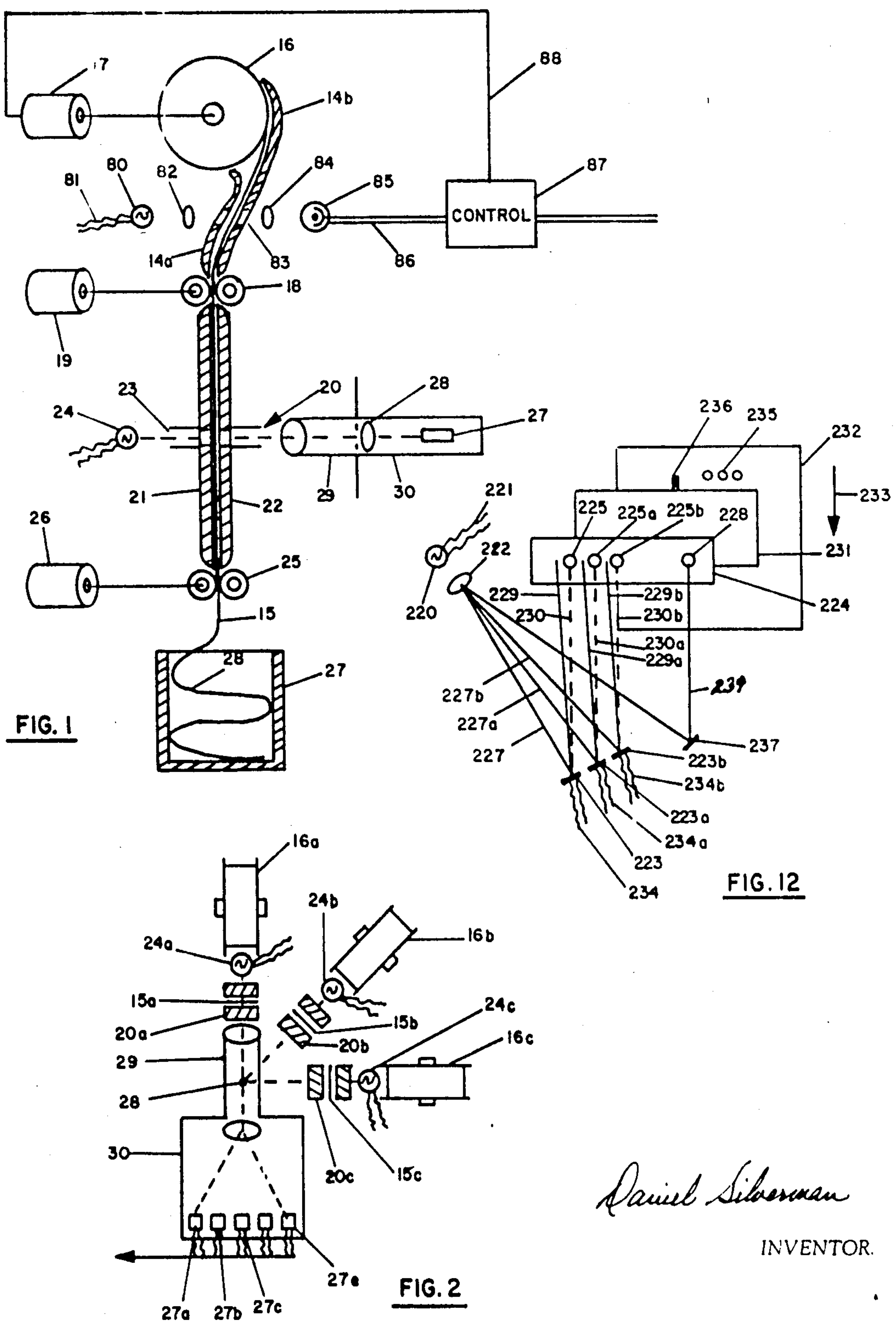

The central scanner comprises up to four separate devices, (a) a high speed photoelectric scanner for reading the digital information, (b) a slow speed reader to read the subject index, (c) a digital recorder to update the digital film strip, and (d) a camera to copy the information on the film strip. The camera can be a single frame copier, or it can be a strip copying camera. It is contemplated that the film strip will be recorded at very high optical reduction ratio to have high density of storage, and the camera will copy the original strip at a nominal magnification ratio. The copy, which will be of nominal reduction ratio will then be scanned to read the information. The camera can copy on film which does not require wet chemical development. This two step, two ratio process is contemplated for the recording as well as the readout of the information.

This invention relates to the storage and rapid retrieval of information. More particularly it relates to the storage of information in the form of bits representing alphanumeric characters. It is concerned with the storage of bit information in a very high packing density, and the retrieval of this information on a random access basis.

This application is a continuation-in-part of my copending application S.N. 158,000, dated Dec. 8, 1961 entitled Microfilm Apparatus now U.S. Pat. No. 3,179,001.

Reference is also made to my patents U.S. No. 2,820,907, issued Jan. 21, 1958, entitled Microfilm Apparatus; U.S. No. 3,158,846, issued Nov. 24, 1964, entitled Information Retrieval Systems; U.S. No. 3,322,030, issued May 30, 1967, entitled Method and Apparatus for Searching an Inverted File Information System; U.S. No. 3,322,033, issued May 30, 1967, entitled Method and Apparatus for Making and Scanning Spot Patterns; and U.S. No. 3,423,743, issued Jan. 21, 1969, entitled Random Access Magnetic Tape Memory System, each of which illustrate and describe one or more elements of the information systems of this invention.

Information in digital form is today used almost exclusively in connection with electronic data processing (E.D.P.) machinery or computers. Such information may be technical and scientific, financial, actuarial, or records of governmental and business organizations. Substantially all of these data are handled by electronic data processing machines, the output of which are generally stored for later use as input for additional processing.

Information can be converted to digital form by specific machines, such as key punch machines, or as the by-product of typewriters or other similar machines, or as the result of conversion from analog information by special analog-to-digital converters. Or this digital information can be provided by optical scanners that read textual material and provide digital characters of the individual alphanumeric characters in the text. Whatever the source of this digital information it is often necessary to store this material for indefinite periods.

Present day conventional digital storage is provided most conveniently in the form of punched paper tapes or cards, or magnetic digital tape. The latter is the most convenient storage medium since the information can be recorded and read out very rapidly, and the information is stored at a packing density considerably higher than that for punched tape or cards. However, because of the high cost of magnetic digital tape, and its substantial volume, there is a practical or economic limit to the amount of information that can be stored in this form. Because of this cost and space, much data and information that should be stored is often destroyed, in the interest of cost savings.

This invention is directed to the design of a simpler, cheaper, more permanent, higher storage density, more rapidly retrievable information system for digital information and numerical data, than the present magnetic digital tape. To accomplish this, I utilize a "microfilm" type of strip which can be a paper or plastic strip on which are impressed patterns of spots arranged in rows of columns. These spots are small (micro-spots), and have distinctive optical properties, such that by optical magnification and detection by photoelectric means the patterns can be identified and the information abstracted.

The present conventional digital magnetic tape generally has 7 columns of bits per one-half inch width of tape (6 of which are information bits and one is control bit) and from 200 to 500, and possibly up to 800 rows per inch. This gives a useful spot (or bit) density of 2400 to 9600 per square inch. On the other hand, photographic methods will permit a spot density of 1000×1000 or 1,000,000 spots per square inch. This is 100 to 400 times higher packing density than that for magnetic tape. Of course, by packing the bit columns closer together the problem of aligning the columns with the photoelectric scanners to provide accurate register is a serious one. However, by the means taught in my patent U.S. 2,820,907, entitled Microfilm Apparatus, issued Jan. 21, 1958, and my copending application S.N. 84,026 dated Jan. 23, 1961, entitled Apparatus for the Storage and Retrieval of Information now Pat. No. 3,158,846, this difficulty can be overcome, and this higher packing density utilized.

In handling large volumes of digital information there are two essential requirements: (1) the packing density must be high so that large volumes of information can be stored in relatively small space, and (2) rapid random access must be provided. That is, the information must be "found" quickly. There is also a third important requirement, which is to provide rapid "readout" of the stored information; that is, getting the information out of the storage system in the form of electrical signals at a high rate of speed into the receiving mechanism that is to utilize the information.

My invention satisfies all of these requirements to a high degree, and in a general way operates as follows: The total volume of information or data is stored on a number of separate digital microfilms. These films can be of any desired length, preferably of from 100 to 2400 feet long. They carry bit information as patterns of spots, preferably as transparent spots on an opaque strip. After illumination and projection of an enlarged image onto a photoelectric scanner, which can be of the multi-element, matrix type or the flying spot type, the patterns of spots can be detected or read, converted to electrical signals, and the signals utilized in any desired manner.

Since it is contemplated that there will be a very large number of spots to record, it is essential that the spot density be high. Therefore, I plan to use indicia such as described in my Patent U.S. #2,820,907 and Pat. No. 3,158,846. With these features it will be possible to read at one time, groups of spots, much larger than those used in conventional magnetic digital recording. Thus, I contemplate reading simultaneously 36, 72, 144, or even larger numbers of bits, in place of the 6 information bits currently read at one time on conventional magnetic tape. This will provide an increased rate of information "read-out" from storage by a factor of from 10–20 or more over conventional means.

Having a scanner that can rapidly scan and read high density bit information the system is designed so that any selected portion of the stored information can be presented to the scanner. As described in my patent U.S. No. 3,179,001, I accomplish this by breaking up the total length of film into separate reels of film. I provide separate film transports and reading gates, through which one or more film strips can be selectively transported. And I place these transports in such a position that their reading gates are all in precise geometric relation to the scanner. Thus the scanner can be controlled to rapidly switch (optically or mechanically) from one gate to another, that is, from one film strip to another. Thus by properly indexing the separate films in a set, each capable of being run through a single gate selectively, and separate sets, each set concerned with one of the multiplicity of gates, the scanner need only search a selected small portion of the total stored information.

Now, by dividing each strip into a number of sections and indexing each section in an easily detected manner, it is possible to select any desired section, in any desired strip, in any desired gate. And by making the strip wide enough to handle a multiplicity of separate columns of patterns of spots, a further division of the total information is possible. It is conceivable that with 20 reels adapted to run into each of 20 gates, with each strip divided into say 50 sections and carrying 5 sets of digital patterns, it is possible to find an item of information without having to scan more than 1/100,000 of the total storage volume. Furthemore, this selection of a particular section, on any one of the 400 film strips, depending as it does on very simple indexing can be done simultaneously with the scanning of a particular section of one of these strips, as is fully described in patent No. U.S. 3,179,001.

Furthermore, since the total storage, for the case assumed above calls for 400 separate film strips, it is a simple matter to update the storage by replacing one or more of the film strips from time to time, as required.

One important object of this invention is to provide readily accessible information storage in digital form in higher packing density than is now available.

Another important object is to provide a storage or memory system for digital data systems of greater capacity and more rapid access than are now available.

Another important object of this invention is to provide a storage system for any type of information, pictorial, textual, or digital that has large capacity and rapid random access.

Another object is to provide an information storage system that can be remotely situated (in a disaster protected location) and which can be communicated with, either to add or to withdraw information, at high speed over conventional communication lines.

Another object is to provide a rapid random access memory of large capacity for digital computers, wherein digital data that now require expensive and voluminous storage means can be stored at low cost and in small space.

Another object is to provide a digital information storage and retrieval system in which the information can be updated from time to time by printing additional information on the record strips.

Another object is to provide an information retrieval system in which the information can be located by first scanning the section index to locate a particular section of the film strip, then the address index is scanned until the proper address is found, before the information scanner is required to read the information.

Another object is to provide an information retrieval system in which the scanner is not required to scan any data or information to find the subject of information required.

Another object is to provide a recording medium of high density that can be rapidly searched for section and address before the information is scanned.

Another object is to provide an information storage system in which a multiplicity of digital microfilm strips are adapted to be run selectively into a multiplicity of film gates with the film strip in one gate being traversed to a particular section, while another strip in another gate is being scanned for address, while another strip in another gate is being scanned for information while another film in another gate is being photographed, while another film is in another gate being recorded.

Figure 3:
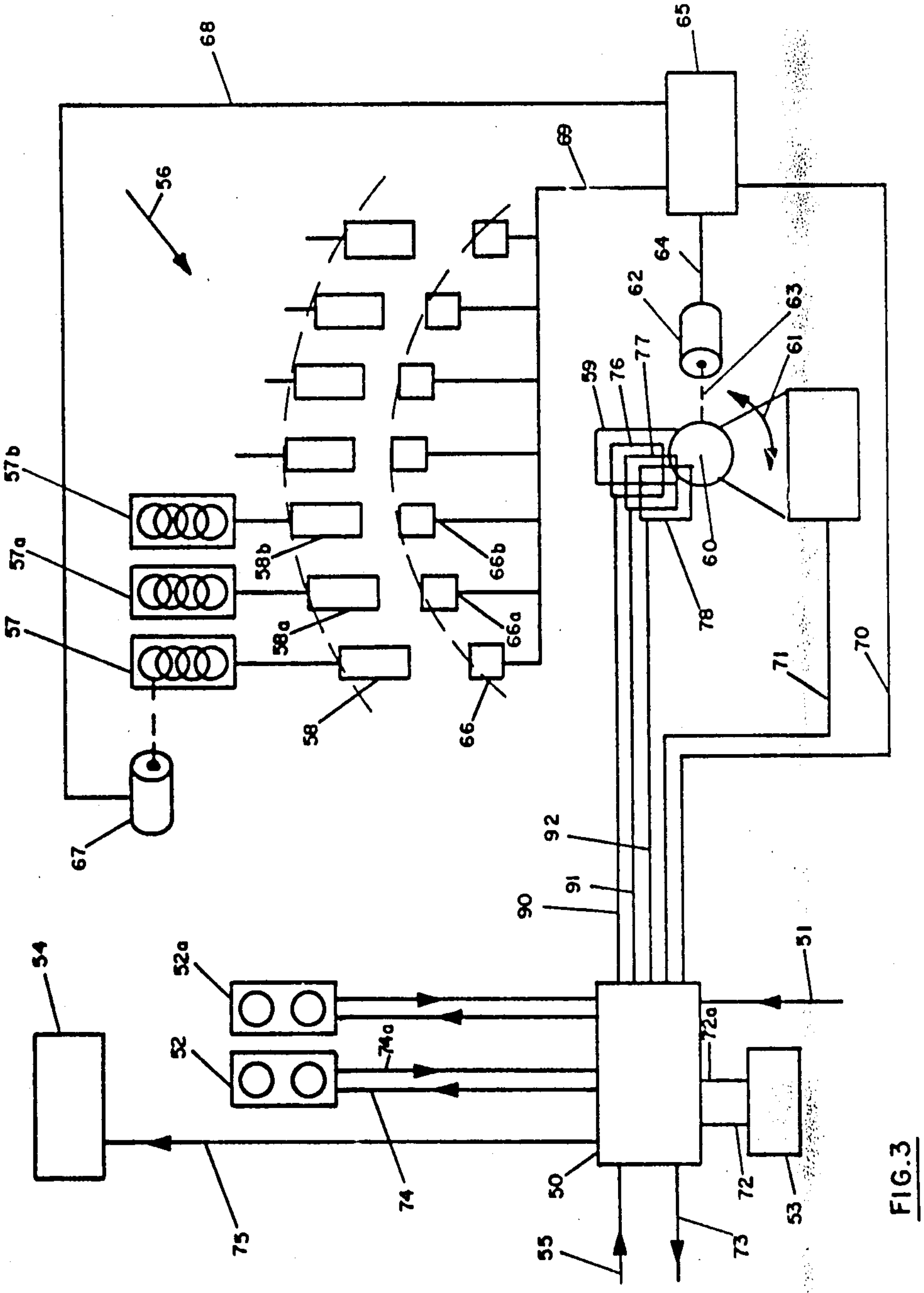
Figure 4:
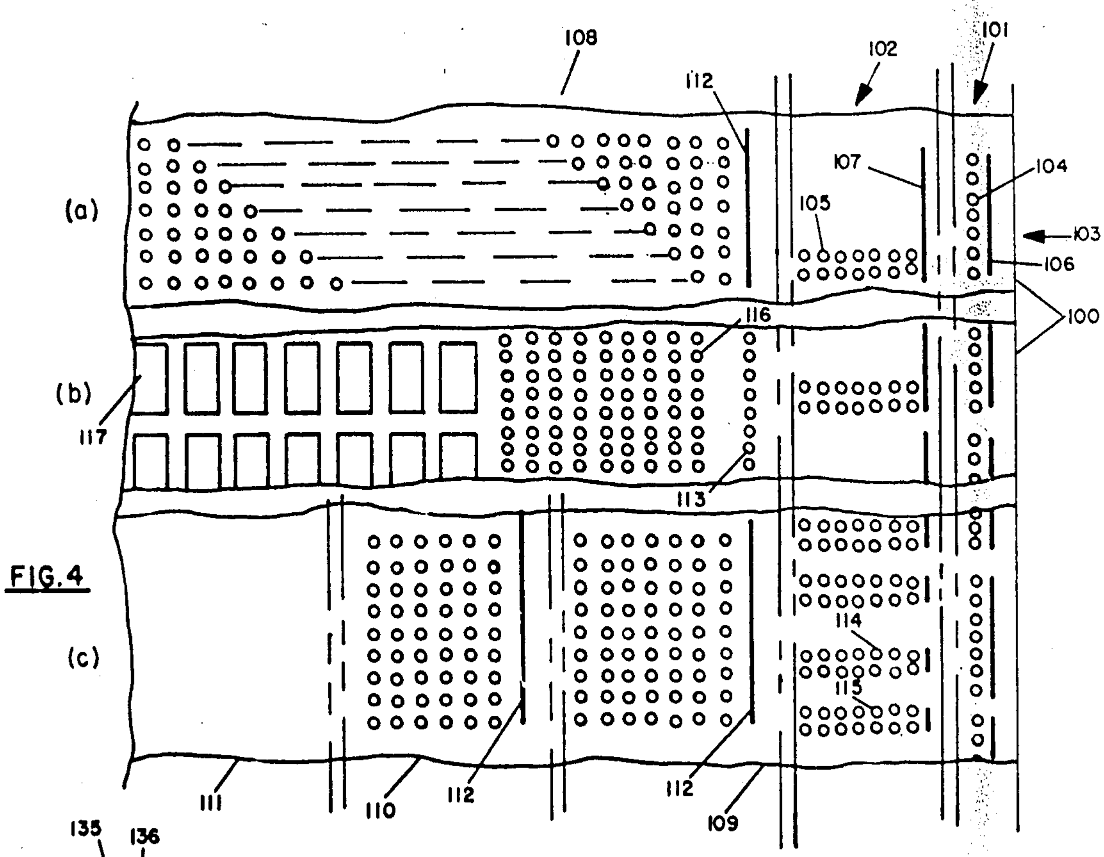
Figures 5, 8, 9:
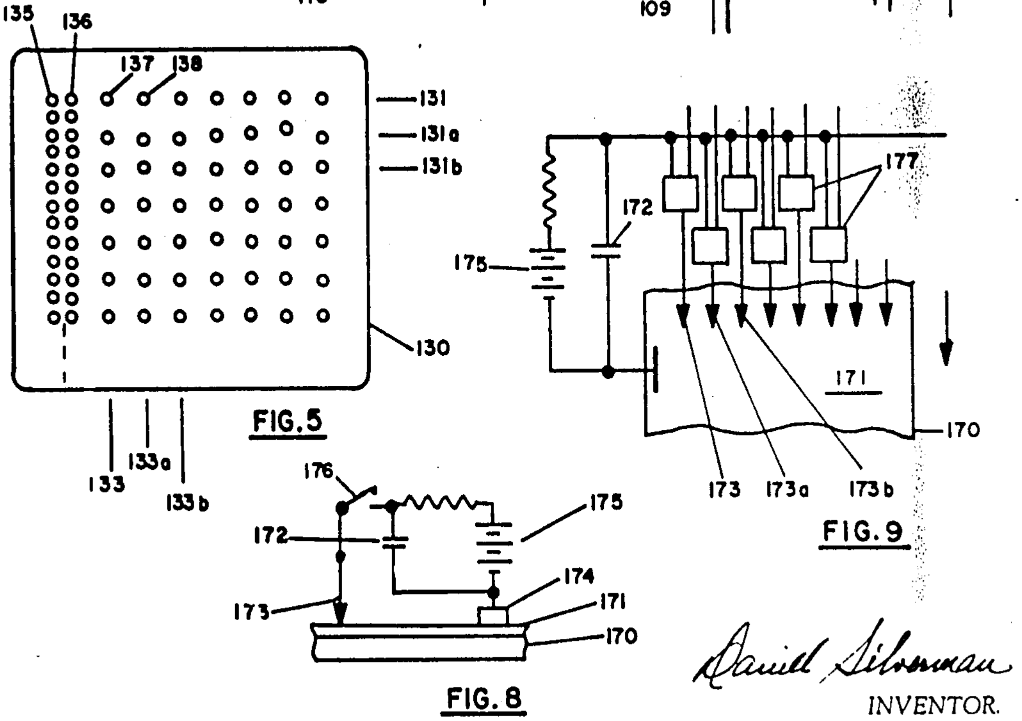
Figures 6, 7, 10, 11:
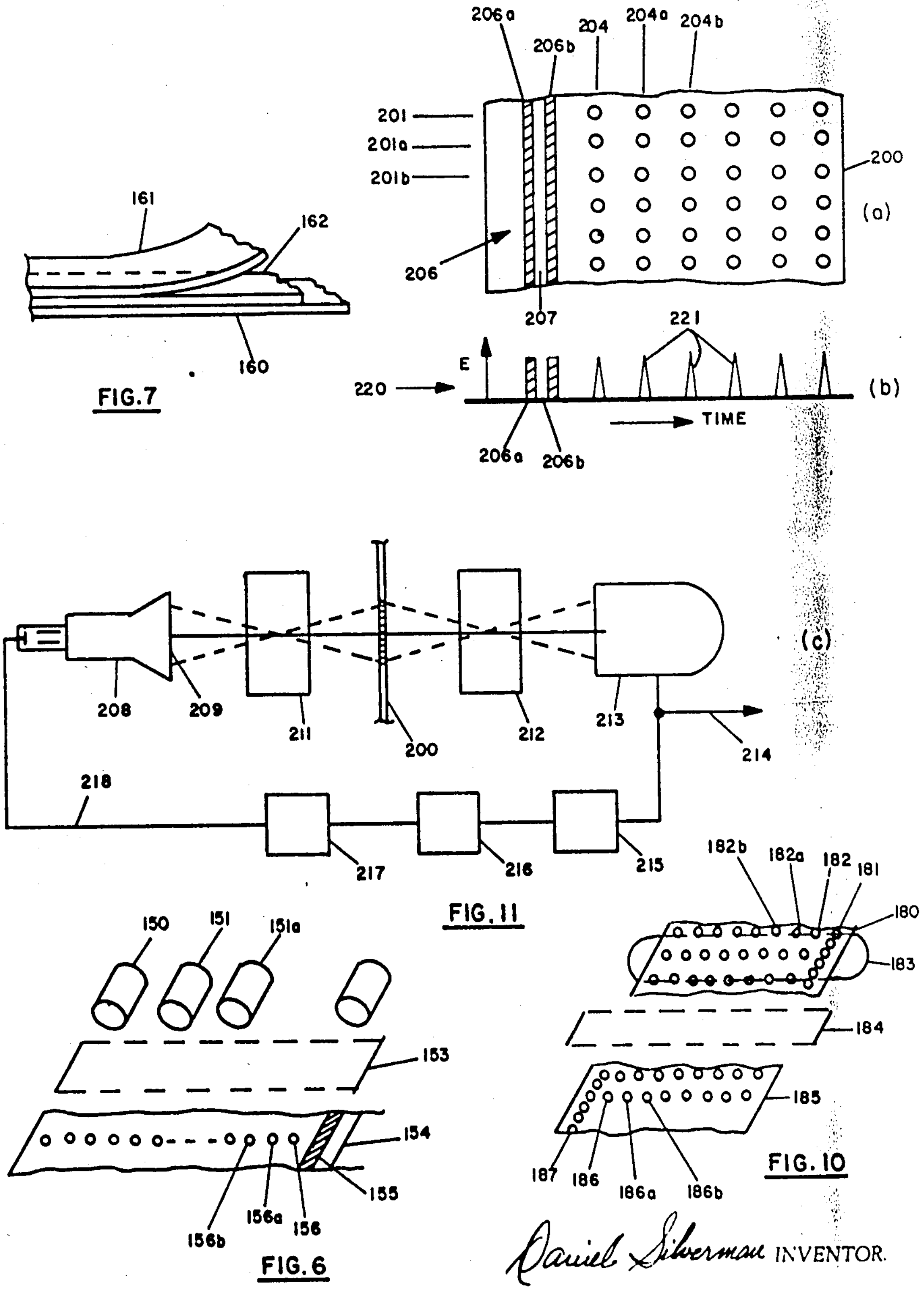

These and other objects of this invention will become obvious, and my invention will be more fully understood by reference to the following description of preferred embodiments thereof and the accompanying drawings, wherein:

FIG. 1 is an elevation view of one part of my invention including film reel and film drive system, FIG. 2 is a plan view of an information storage system employing a multiplicity of film strips in a multiplicity of film gates, and a scanner system to selectively scan each gate, FIG. 3 is a schematic diagram of an entire information storage and retrieval system, FIG. 4 is a sample storage record strip of the type to use in my retrieval system, FIGS. 5 and 6 are two embodiments of recording means for producing digital microfilm strips for use in my retrieval system, FIG. 7 is one type of information record strip for use in my system, FIGS. 8, 9, and 10 are three other embodiments of recording means for producing digital microfilm strips, FIG. 11 is another embodiment of a scanner means, and FIG. 12 is another form of recording means for producing digital microfilm record strips.

In FIG. 3 is shown in schematic form a complete information storage system. The heart of the system is a computer type control center, 50. This could very well be the main frame of a large electronic digital computer. The term "computer" is used only in a general way, to indicate that the type of "reading" and "writing" on magnetic tape, "searching," etc., which are needed in my system, are already available in most large electronic digital computers. These large computers are information systems in themselves, since they have rapid access memory (core) and slower, semipermanent storage in the form of magnetic tapes, and so on. They even have large magnetic disc storage elements that provide rapid random access to large amounts of digital information. However, none of these storage devices equal my storage system either in magnitude of storage, or compactness of storage, or ease of retrieval, or rate of readout from storage.

Referring to FIG. 3, data or other digital information can come into the system from any source over line 51. This information can go into temporary storage on magnetic tape, 52, 52*a*, or into core storage 53, or to the digital microfilm recorder 54 for permanent storage.

Requests for particular blocks, items, or subjects of information to be retrieved from storage may enter the system over line 55 going to the central control unit 50. These requests will generally be in the form of index addresses of the information in the permanent digital microfilm file 56.

This permanetn digital storage comprises a multiplicity of groups of reels of digital microfilm 57, 57*a*, 57*b*, etc., each group adapted to be run selectively into one of a multiplicity of film gates 58, 58*a*, 58*b*, etc. Each of the gates 58 are in precise geometric relation to a rapid scanner 59, adapted to be selectively placed in scanning relation to any one of the gates 58. This is indicated schematically by arranging the gates in a circular pattern and having the scanner 59 pivoted about the center of the circle 60. The rotation of the scanner is indicated by the arrow 61. The scanner is positioned by motor means 62, through drive 63, under the control of signals transmitted over lines 64 from the index control unit 65.

This type of permanent digital microfilm file 56 is illustrated and fully described in simpler terms in my patent U.S. No. 3,179,001. In that patent the array of film strips 57 and film gates 58 each in symmetrical optico-geometric relation to the scanner 59, are illustrated in the patent in connection with FIG. 2. Also each of the separate filmstrips in the groups of microfilms 57, 57*a*, 57*b*, etc. can be stored and controlled by means such as illustrated and described in the patent in connection with FIGS. 8 and 9.

Each of the films in the multiplicity of reels 57 is divided into sections and a section index of a simple nature that can be read by index comparators 66, 66*a*, 66*b*, etc., arranged respectively in accurate relation with the gates 58, 58*a*, 58*b*, etc. One simple type of photoelectric index reader is illustrated and fully described in connection with FIG. 1 of my patent U.S. No. 3,423,743. On instruction from the index control unit 65, to the motor drives 67, etc., over line 68, and to the index comparators 66, 66*a*, 66*b*, etc., over lines 69, the appropriate tape or tapes 57 are traversed in appropriate gates 58, and their indexes are compared by comparators 66, whose indications are transmitted to the index control unit 65 over lines 69. Thus, on instruction from the central control unit (C.C.U.) 50, the index control unit 65 will position one or more film strips in their respective gates to the desired section.

The next step is to direct the scanner 59 to the proper gate to read the desired section of the film. The scanner 59 is illustrated schematically in FIG. 3. One embodiment of a scanner is illustrated and described below in connection with FIG. 2. FIG. 2 of this application is similar to FIG. 2 of my patent U.S. No. 3,179,001 which is fully described and illustrated therein. The scanner 59 is adapted to be rotated about axis 60 (or axis 28 in FIG. 2) so that it can be directed optically, selectively and separately to each of the gates 58 (or film gates 20 in FIG. 2). The output of the scanner goes by lines 71 to the C.C.U. where it goes by line 72 to core storage for further processing, and such other action as transmission by data link 73 to another location, or over lines 74 to conventional magnetic tape units 52, or over line 75 to a digital microfilm recorder 54, for updated storage, etc. The films prepared in the recorder 54 can be placed in the storage unit 56 for later retrieval.

Since the art of this invention has progressed to the point where a number of equipments are commercially available which will accomplish the logical steps involved, and since the detailed electronic circuitry required to accomplish these steps are not part of this invention, it is not felt to be necessary to describe this circuitry further. The Benson-Lehner "Flip," manufactured by the Benson-Lehner Corporation of Santa Monica, Calif., the I.B.M. "Walnut," manufactured by the International Business Machines Corporation of New York, N.Y., the National Bureau of Standards "Microfilm Rapid Selector" and other similar devices, all utilize this type of logical circuitry. U.S. Pat. No. 2,873,912, "Electronic Comparator" describes in detail the circuits for construction of an electric comparator for comparing the patterns of spots, such as might be found on punched paper tapes, etc. Also, the book "Tools for Machine Literature Searching" by J. W. Perry and Allen Kent, Interscience Publishers, New York, 1958, chapter 18, pages 489–579, describes another type of digital scanning and selecting system for searching for specific patterns of bits. There are also many textbooks on computers, such as "Computer Logic—The Functional Design of Digital Computers," by Ivan Flores, Prentice Hall, Inc., 1960, which describes many logic circuits for making comparison of multi-bit patterns, and as the result of the comparison, taking particular control steps previously decided upon. U.S. Pats. No. 1,889,575, "Method and Apparatus for Reading Books and the Like," No. 2,121,001, "Method of and Apparatus for Indexing and Photo-Transcription of Records," and No. 2,830,285, "Storage System," and many others all show various types of scanning and control systems that might be adapted to the type of system described in this application.

Both the index control units 65 and the C.C.U. 50 are very similar to commercial units of these types. For example, commercial computers will take instructions, will start and stop strips in tape readers and writers, will read digital information from tape, compare it with preselected sample patterns, make logical decisions and execute controls based on those decisions, and so on. The details of these commercial devices are well known, and there are many texts available which teach these control and design principles. Therefore, while these devices are necessary parts of my total information system, I do not intend to claim these specific designs and will not describe them further, referring the man skilled in the art to the various sources of information available.

I have pointed out how digital information can come into the C.C.U. over communication or data link 51. This can then go into temporary storage in the core 53 or the tape units 52 or it can go to the recorder 54 to be recorded permanently in the form of digital microfilm. This film record then can be placed on the film reels 57 and be searched on demand, the information read out and delivered to a distant point over line or data link 73. If this recording and retrieval system is located in a "disaster safe" location, important data and information in digital form can be transmitted from a distant point by wire or radio, recorded in temporary or permanent form, and permanent record maintained in safe retrievable form, and the information read out on demand and delivered to any distant point. It will be clear that printed or typewritten information can be scanned and converted to digital form, with fewer digital bits being required to define the character than if it was stored in pictorial form, or transmitted by wire as facsimile transmission. Therefore, I contemplate the step of converting textual information at the distant point to digital form, transmitting the digital characters to the "safe" area and there permanently recording the digital information on microfilm in easily retrievable form.

In FIG. 3, I show in connection with the photo-electric scanner 59, three other devices: One of these is the recorder 76 which will be described in detail later, to add recorded digital information while the film record is in the film gate. Device 77 can be a camera device for taking a picture, on a separate film, of the information being retrieved. This can be either digital or pictorial information. The manner in which such a camera can be used is fully described in my patent U.S. No. 3,179,001 in connection with FIGS. 6 and 7 thereof and columns 5 and 6 of the specification.

Finally, 78 can be a scanner of the same type as 59, or some simpler type, to scan and read the subject index character, in searching for a particular subject of information. This scanner 78 can be mounted with scanner 59 as shown on the same axis and separately rotatable, or it can, like the scanners searching the section index on each film strip, be mounted on the individual film gates.

All four of these devices, the information scanner 59, information recorder 76, subject index scanner 78, and camera 77 can be free to turn to each of the film gates, together or separately. To do this they must each be mounted so as to rotate about the same axis, though positioned in adjacent positions along the axis, as illustrated in FIG. 6 of my patent U.S. No. 3,179,001. It will also be clear from column 6 of my patent U.S. No. 3,179,001, as the four separate devices are positioned along the direction of the strip travel, that either separate gates or long gates must be used to cover the length of the 4 devices along the axis, and the corresponding relative positions of the data along the strips must correspond with the actual relative positions of the several devices along their axis of rotation. Thus all four operations can be carried on simultaneously in any four of the film gates.

In my Patent U.S. No. 3,179,001 I show a typical film transport system in which an elevation view of a single strip drive is shown in FIG. 1 therein, and a plan view showing a scanner in cooperative relation to a multiplicity of film gates is shown in FIG. 2. These figures are repeated herein, to show some of the detail required in the permanent storage unit 56 and the scanning unit 59.

Referring now to FIG. 1, I show in schematic form one version of my invention. This includes a microfilm strip 15 wound on reel 16. The reel can be driven by motor 17 to feed the strip out, or to reel the strip in. The strip passes between guides 14 to rollers 18 that can be driven separately by motor 19.

The film 15 is driven by means of motors 17 and 19 through the film gate 20, which may, for example, be constructed of guide plates 21 and 22. The film gate may also include rollers, etc., as is well known in the art, to guide the film strip and hold it steadily in the plane of the film gate while it is being traversed rapidly. The film strip then passes to roller 25 driven by motor 26. The film then passes into a film receptacle 27 into which the strip falls in folds 28. Much of the detail of film drive, film gate and receptacle can follow the art which is well known. By proper design of drives and with continuous guides, the film can be rapidly fed from the reel through the film gate and into the receptacle and also be quickly withdrawn from the film gate without manual handling. This type of film drive in which the film strip can be threaded through the film space automatically, and advanced or withdrawn at will, is utilized in commercial optical instruments and film readers. One of these is the Recordak Lodestar Reader, manufactured by the Recordak Corp. of Rochester, N.Y. The specific arrangement of controls, drives, guides, reels, etc., are not part of this invention, and any one of many different styles can be adapted to this purpose. Further description is felt to be unnecessary in view of the state of the art.

Behind the film gate 20 is an illuminating system shown schematically as 24. This is to back-light the film strip and thus to present to the optical system 29 a pattern of bright spots of light representing at least a part of the information on the microfilm. The optical system is arranged to present an enlarged image of the illuminated film in gate 20 onto the scanning array 27. As shown in FIG. 2, this is an array of separate photoelectric detectors 27*a*, 27*b*, 27*c*, etc., arranged in the focal plane of the optical system. The scanning and optical elements are enclosed in a light tight container 30. While I have shown a matrix type scanner, it will be clear that a flying spot or other type of scanner can be used as is well known in the art. Reference is made to my patents U.S. No. 3,322,030 and No. 3,322,033. As shown in FIG. 3, the signals from the separate photoelectric elements in the scanner 27 go to the C.C.U. where appropriate circuits, well known in the computer art, take these signals and act upon them in any desired way.

In FIG. 1, I show an opening 83 in the guides 14. Light source 80, supplied with power over leads 81 and optics 82 focuses light through the opening 83 to the optics 84 and photoelectric cell 85. The output of this goes by way of leads 86 to control means 87, the details of which are not shown, but well known in the art, to control, by means of leads 88, the motor 17. These circuits perform like a limit switch, by means of which the drive motor 17 is prevented from driving the film *forward* into the film gate until all films are *reeled in* past the point of the photoelectric limit switch. This prevents the possibility of a second film being run into the film gate while one film is already in the gate. It will be clear that this same type of a limit switch would be provided with each reel in the group adapted to run through a single film gate. Such multi-reel assemblies are shown in FIGS. 8 and 9 of my patent U.S. No. 3,179,001.

In FIG. 2, I show a plan view of one embodiment of my invention. This includes a multiplicity of film gates 20*a*, 20*b*, etc., with appropriate reels 16*a*, 16*b*, 16*c*, etc., feeding microfilm 15*a*, 15*b*, 15*c*, etc., through the film gates as in FIG. 1. Each of the reels represent a single reel or a multiplicity of reels utiliznig, respectively, each of the film gates.

In this view, the film gates are arranged in circular symmetry, such that as the optical system 29 with its scanning system 27 is rotated about axis 28, each of the film gates will successively be focussed on the scanning system. In this way the scanning system can be shifted from one microfilm to another in a very short time.

In FIG. 1, instead of having separate reels of film adapted to be threaded automatically through the gate, it is possible, as is well known, to have a single large reel of film as input at the top, and a large take-up reel in place of the container 27. This film, once threaded through the gate, remains in the gate until the film is manually changed.

In FIG. 4, I show a digital storage strip of the type that can be used in my invention. These storage strips can be made of paper, plastic, thin metal, or the like, and can operate on the basis of the transmission or reflection of light, or by the color of transmitted or reflected light, and so on. The patterns of spots can be created by electrical, electrochemical, mechanical or other means, or by silver or other photographic means, by xerographic means, or by electrostatic-thermo plastic means, and so on. The important characteristics of this strip is that it can store information at high density in a particular format.

I show three different formats of the strip, (*a*), (*b*), and (*c*), of the strip 100. For convenience, the description and discussion will be given in terms of a photographic microfilm strip although any of the above types could be used equally well. In each of the 3 parts I show a longitudinal section 101 and another 102. These representing the form of either a longitudinal array of bits 101, or a transverse array of bits 102, a simple index to identify the longitudinal section of the film strip. Assume that the entire length of the strip is to be divided into 100 sections, then a 7 bit character 104 will serve to identify each of the 100 sections. These 7 bits can be arranged transversely as 105 and be read by a seven unit photoelectric assembly, or they can be read sequentially by a single photoelectric unit and the sequential pattern of spots 104 compared with a preselected pattern. In general, only one of the two index systems 101 or 102 will be required to identify a section of the film. In each case, however, it is necessary to print the index spot pattern in association with and substantially at the same time as a longitudinal reference line or transverse indicium 106, 107, to guide the spot scanner so as to align the columns of spots 104 and 105 with their respective photoelectric detectors. This indicium 106, 107, not only serves as a transverse guide or index but can also serve (by its design) as a longitudinal guide or index. This is more clearly explained and described in my patent U.S. # 2,820,907.

Thus the film strip will have a section index of the type of 101 or 102, so that appropriate comparators and controls will recognize the index pattern and stop the film strip in its gate with the start of a desired section of the strip in the gate. Now the film strip is in position for the main scanner 59 to read the information from the film and transmit it to the C.C.U. The remainder of the film strip is used for the storage of information. This can be in the form shown in FIG. 7 of my patent U.S. No. 3,179,001, of which this is a continuation in part. In that FIG. 7, I show the information in two forms, a pattern of spots 47 and a multiplicity of micro images of pictorial information. In that figure the index 52 serves the same purpose as the index 101 or 102. While it is possible to store both pictorial and digital information, in this format (*a*) I prefer to store only digital information. Thus the remainder of the width of the tape can be devoted to a single area of spots 108 or a multiplicity of areas 109, 110, 111, etc., of format (*c*).

This is a matter of choice and design. Because of the high packing density, one-half inch wide film can store of the order of 500 bits per row. These can be read all at one time, as in 108, or they may be read in smaller groups as in 109, 110, 111, etc. Reading larger groups of spots simultaneously increases the cost and complexity of apparatus, but also increases the speed of handling of the information. On the other hand, reading smaller groups can still increase the speed of reading manyfold over present systems, and still have a fairly simple practical equipment. It should be found quite practical to read 36, 72, 144 or more bits simultaneously in place of the present 6 bits of information on magnetic tape. Also, designing the film strip with separate longitudinal sections 109, 110, 111, etc., breaks up into still smaller parts (by a factor of up to 10/1) the separately indexed packages of information in the total system.

Whenever a scanner must read a pattern of microspots as in 109 or 110, for example, it is necessary to provide an index line 112, as described in connection with sections 101 and 102, or a column of index spots 113 as shown in part (*b*). The use of this index column is described in my patents U.S. No. 2,820,907 and No. 3,158,846.

One of the objectives of this invention is not only to provide a high density storage system, but also one from which the data can be retrieved rapidly. This involves two steps, namely: the ability to quickly "locate" the information, and the ability to "read" the information at a rapid rate. One of the particular advantages of my system lies in the ease with which scanning of the storage strip can be carried out to "find" the desired information.

In the conventional well known magnetic recording digital record strip, 7 columns of magnetized spots are used, with rows of magnetized spots or bits spaced along the strip of the order of 200 to 800 per inch. Because of the relatively few columns of bits, the address characters, or the grouping of bits or spots that define the address or index of the subject matter of the information, are similar in position and general form to the information patterns themselves. Thus in searching for a given address, every row of bits must be scanned, whether it be address or information.

The process of scanning as used in tape input digital data processing or computer devices involves reading the bit information row by row as the tape is traversed past the reading or scanning heads, and passing these electric signals through a computer central control unit or equivalent, into a core storage or equivalent memory element. When a sufficient number of rows of bits have been read to fill the memory to a preselected proportion, the tape unit is stopped and the control element then proceeds to withdraw bits from the memory to compare the patterns with a preselected index pattern. This process is repated until the correct index is found or until all rows of bits on the tape have been scanned. On a 2400 foot reel of tape there can be of the order of 15 million bits or spots of information that have to be handled in this complicated and laborious manner.

In my invention I have a far greater density of columns of bits, perhaps as many as 500 per one-half inch wide tape in place of the 7 bits on magnetic tape. Thus I can afford to use 1 or 7 of this 500 exclusively for address index. In this way, I avoid the need of scanning all the information bits as well as the index bits to retrieve a particular volume of information. This is shown in FIG. 4 in section (*a*) of the information strip. Here there are three transverse areas of the strip. One of these 101 is devoted to section index. Another 102 is devoted to subject index or information address, and the third 108 is reserved for information storage. This large area can, if desired, be broken into several separate information areas as 109, 110, 111, etc., in part (*c*), for the reasons given above. Thus, at a sacrifice of a small fraction of the total storage capacity of the strip, the entire storage can be scanned for subject index by examining only a small fraction of the total bits on the strip. In this way, the retrieval process is speeded up.

Another way in which the retrieval process is speeded up is by the ability to read information off the record strip in larger bunches, patterns, or groups of characters (that is, in more bits per row) than is possible with conventional digital storage means. Present day digital data handling electronic equipment is said to be "input-output bound," meaning that the overall operation of the equipment is limited in speed of operation by the relatively slow speed at which bit information can be read into memory. The reason for this limitation is the limit to speed of traverse of the strip or tape, and the relatively limited numbers of rows of bits per inch of tape. But most of all, it is limited by the very small number of bits per row. In my patent U.S. No. 2,820,907 and patent U.S. No. 3,158,846, I teach how the number of bits per row can be increased ever greatly, by the use of longitudinal and transverse guide indicia. This present invention is directed to other improvements in storage devices, but of course, can, and does make use of the control indicia to increase the total storage and rate of retrieval of stored information.

So far, as the section index and subject index are concerned, while they preferably will utilize control indicia, since there are relatively few bits to the patterns they represent, the bits may be read sequentially, in single columns as in 101, or simultaneously in rows, as in 102, as is well known in the art. I have not shown in detail the circuitry involved in the scanning and control operations since these are well known in the art. My system does not require any specific type of control system. And, since there are on the market many different types and makes of computers and electronic data processing devices, the control circuits of almost any one of which can be adapted to my apparatus, and since there are many brochures, technical articles and text books available, which describe these control circuits, the man skilled in the art is referred to these for detailed information.

My storage system does not require any specific types of record medium, or any specific density of spots or bits. Of course, the greater the density, the greater the storage capacity. However, it may be desirable to choose a storage medium that has somewhat less than maximum storage capacity, in favor of greater ease of preparation or greater operating life, or less noise generated by imperfections, etc. Unlike the conventional magnetic tape, the optical storage system does not lend itself as readily to the erasing of information from the record, and rewriting new information on the record. However, my system does permit of a choice of materials, such that will permit, by proper design of format, to leave certain areas of the strip blank, so that at later times information can be added. Section (*c*) of FIG. 4 indicates how this might be done, for example, by recording area 109 to start, then as later information is to be added, areas 110, 111, etc., can be filled in, and so on. At the same time new subject index characters 114, 115, etc., can be added as the new information is added. Thus, I contemplate in my invention a type of permanent, non-erasable record strip in which digital, as well as pictorial information and address index can be added from time to time. This is shown in section (*b*)

in which information is stored in digital form 116 and pictorial form 117. See also column 15, lines 11–38 for an eraseable record material.

In order to add information to the film record, I have provided, in association with my scanning head, a recording head 76. This unit, taking commands over line 90 from the C.C.U. 50, is capable, as will be shown later, of recording additional information in the form of patterns of spots, on to the record strips already in the system. It is possible also to remove the information record from the retrieval unit 56, and replace it in the recording unit 54 so as to add the additional information. The recorder 76 is provided for convenience in adding small amounts of information from time to time onto the record strip, and for erasing and retrieving.

One way in which a photographic digital microfilm record strip can be prepared is illustrated in FIG. 5. This shows the face of a cathode ray tube 130 on the screen of which is shown a pattern of spots in rows 131, 131*a*, 131*b*, etc., and columns 133, 133*a*, 133*b*, etc. This pattern can be prepared by programming a computer type system to present to the cathode ray tube, deflecting voltages on the X and Y deflection plates, to position the cathode ray beam to a desired point on the tube face, and then apply a potential to increase the beam current to a value sufficient to make a spot of light of the desired intensity. By repeating this process as many times as desired, as complex a pattern of spots as desired can be developed. The face of the cathode ray tube is then photographed onto a strip film. After development, the film (or a copy thereof) is used as the storage record strip.

This process is well known in computer technology, and there are a number of commercial recorders of this type on the market. By programming the computer, longitudinal and transverse control indicia, such as 135, 136, etc., can be recorded in association with the data spots 137, 138, etc. Any pattern of control indicia 135, 136, such as a single column of dots, or multicolumns of dots can be used. The number of dots in the columns 135, 136, can be greater than the number of rows 131, 131*a*, etc. They can even be made to overlap if desired to make a continuous line, with longitudinal index breaks placed as desired, as is well known. While the actual generation of the spots in the indicia 135, 136, are not absolutely simultaneous with those of the pattern 137, 138, etc., they are in close enough time agreement that the geometrical placement of spots and indicia can be considered to be simultaneous.

The pattern of the cathode ray tube face can be as simple as that in FIG. 5, or as complex as that of FIG. 4. The complexity lies in the programming of the computer. Also, instead of a two-dimensional array of spots, the cathode ray tube need only show a single line of spots, with the film being advanced each time a line of spots is exposed and recorded. Or the film can be in continuous movement and the sweeps of the cathode ray beam timed to give the proper spacing on the film. If desired, the sweep line on the cathode ray tube face can be tilted such that the time of travel of the beam across the tube (or film) is timed with the rate of film movement to give a truly horizontal line across the film.

Of course, it is possible to use an array of crater lamps or glow lamps or other spot-of-light generating means 150, 151, 151*a*, etc., as shown schematically in FIG. 6. These are lighted in desired patterns and an image formed by lens system 153 on the film 154 to form the images 155, 156, 156*a*, 156*b*, etc. Image 155 is an index line and spots 156, 156*a*, 156*b*, etc., describe the information recorded.

This recorded film can be used, after processing, as the information record. Or a copy can be made. This is generally desirable since it is best to have translucent spots on an opaque background. Of course, different colors of spots can be used to increase effectively the density of storage. A copy of the original film can be made on Kalvar film. This is a commercial film that does not require wet chemical development. It is exposed by illumination with ultraviolet light, and it is fixed by heating to a specific temperature, usually by infrared rays. In view of this convenience, I propose to use in my system a strip film composed, as shown in FIG. 7, of three elements; namely, two layers of plastic film, with a layer of Kalvar photographic emulsion between. The two strips 160, 161, are tough, clear, non-stretchable plastic, such as Mylar, for example. Layer 162 is the conventional Kalvar emulsion, which is normally applied to one surface of the strip 160. The cover strip 161 is for the purpose of protecting the Kalvar emulsion 162 from scratches, etc., in use. Thus this type of film strip will provide less noise, interference, or misinformation on the record. Also, the three piece assembly can be prepared at the factory, and the Kalvar later exposed and fixed through the overlying plastic layer. Of course, the original film strip can be Kalvar film, but a somewhat more complicated recording system may be required to provide the spots of ultraviolet light. One such recording system is shown in FIG. 10. Also, in view of the nature of the Kalvar film, it is possible to update the film, as mentioned above, by leaving spaces blank in the original printing, and printing additional areas at subsequent times. In view of the dry fixing process, this should offer no problems. It will be clear also, that in order to make an information strip that is protected mechanically, it is possible to cover a conventional silver emulsion photographic film with a clear plastic strip. However, this must be added *after* the film is developed and fixed, whereas the Kalvar film can be prepared with the plastic cover strip in place before the film is exposed.

Kalvar is a trade name of a recording film manufactured and sold by the Kalvar Corporation of New Orleans, La. Technical information on its use can be obtained from the Kalvar Corporation. Also, reference is made to "The Basis of the Kalvar System of Photography," by Dr. Robert T. Nieset, Proceedings National Microfilm Assn., Tenth Annual Convention 1961.

Another type of optical digital record strip is shown in FIG. 8. Here the strip 170 can be a thin plastic strip such as Mylar. This is coated with a thin layer of conducting material 171, such as an evaporated film of suitable metal. By passing a current from a condenser 172 to a pointed electrode 173 to the material 171 and back through contact 174 to the other terminal of the condenser, a small hole can be burned in the metal layer 171. By control of the total current, or charge, such as by control of the voltage and capacitance of the condenser 172, the size of the hole can be changed as desired. Now, by placing a multiplicity of such pointed electrodes or needles 173, 173*a*, 173*b*, etc., across the strip 170, as in FIG. 9, and by using relays, thyratrons, transistors, or other control element of like type 177, in place of switch 176, this recording assembly can be programmed to print rows of dots across the strip as it moves longitudinally, the patterns of dots in each row depending on the programming of the relays 177. If desired, a higher voltage source 175 can be used and a spark caused to pass from the electrode to the layer 171. This record medium needs no "fixing step" and thus additional spots can be recorded from time to time, as desired. The array of closely spaced points or electrodes can be provided by the electrodes sealed into the glass face of the Print-A-Pix tube, which is a commercially available cathode ray tube, (manufactured by the Litton Industries, Inc.) and the switching can, of course, be handled by control of the position of the beam, which not only provides the contact with the desired wire, but also the voltage and current needed to perform the recording step. This same Print-A-Pix tube can be used as will be explained further below, to provide an electrostatic charge on an insulating strip material.

The same type of recorder shown in FIG. 9 can be used with a paper or plastic tape coated with electrochemical materials which show different color, opacity or other optical property on the passage of current. Such materials as those used on commercial Teledeltos paper are among those that might be used. In a similar way, the electrodes 173 might be used to spray an electrostatic charge onto an insulating strip of paper or plastic, to which spots of charge can later be attracted certain electrical powders, for permanent attachment to the strip. This involves the well known Xerox printing process. Other similar electrostatic or photographic processes using these or other principles on paper, plastic, metal, or other strips can be used as a record in my information system, as is well known in the art.

As mentioned above, and shown schematically in FIG. 3, is a recorder element 76 associated with the scanner 59 and geometrically related (as is the scanner) with each of the optical gates 58. This recorder can be used to add additional patterns of spots to the information already recorded. This information can be recorded by the common central recorder 76 or by separate similar units mounted on each optical gate, or by returning the strip to the original recorder unit 54. Whether one or the other of these processes is used to add information to the record strip will be at the convenience of the user. Of course, all of the types of recorders cannot be used in each of the three areas mentioned. For example, the recorder 76 could present a pattern of lighted spots to be imaged on the strip film. If this is Kalvar, the lighted spots would have to be ultraviolet light, either small crater type lamps or a large ultraviolet light source with a mask containing openings in the desired pattern. The desired pattern could be provided by a master tape or film, or a punched paper tape containing patterns of spots. This is shown schematically in FIG. 10 in which 180 is a strip of opaque tape with transparent spots **181, 182, 182*a*, 182*b*, etc. Behind this is a source of ultraviolet light 183. The pattern of bright spots exposed by the holes in the tape is imaged by lens system 184 to form an image on the Kalvar film 185, which could be of the type shown in FIG. 7. This provides images of the spots 186, 186*a*, 186*b*, and indicia 187**, all shown schematically. There is also required the fixing step which requires irradiation by infrared rays which can be simply provided.

All types of recorders shown schematically in the various figures could not be located in the central position 76, but some could be associated with one or more of the optical gates. And, of course, any of the types illustrated could be used in the original printing device 54 in which the record strips were prepared.

The scanning of the record strip can be by a device of the type shown in FIG. 2 and operating on the principles described in my U.S. Pat. Nos. 2,820,907 and 3,158,846. There are other types of optical scanners known in the art, either using separate discrete photoelectric detecting units (preferably operating with control indicia to maintain proper register between the spot image and the detectors) or using some type of flying spot scanner. This is illustrated schematically in FIG. 11. In part (*a*) is shown a typical information strip 200 of the type described in FIG. 4. The pattern may consist of a pattern of spots in rows **201, 201*a*, 201*b*, etc., and columns 204, 204*a*, 204*b*, etc., printed in association with guide indicia 206. These indicia might be a single line, or a pattern of lines 206*a*, 206*b*, for example, spaced apart a known distance 207**.

In part (*c*) of FIG. 11, I show a cathode ray tube 208 with face 209 and trace of the beam in a line across the face. The trace of the beam across the face is imaged by lens system 211 onto the film strip 200. As the image of the beam passes each of the translucent spots on the film, light passes through and is imaged onto the photomultiplier tube 213 by lens 212.

In section (*b*) I show a trace of voltage spikes 220 comprising two spikes corresponding to the passage of the beam image across the indicia lines **206*a*, 206*b*. The characteristic pattern of spikes 221 which follow the spikes 206*a*' and 206*b*' are set by a clock which starts on receipt of the characteristic pattern 206*a*' and 206*b*' etc. The spikes 221 are then used to brighten the beam current as the beam advances, at the equal time intervals of the spikes after passing the indicia. If at the times the beam is brightened it is in such a position that its image is directly over a spot on the film, then a spot of light will be exposed to the photoelectric detector 213, and a pulse of current or voltage will be sent out over the output leads 214. As shown in FIG. 3, the output from scanner goes by way of leads 71 to the C.C.U. 50** and is utilized in its circuitry.

In this type of scanner, the timing of the impulses from the scanner detector 213 are synchronized with the position of the spots relative to the indicia 206. Thus, as the lateral position of the film in the film gate varies, the *absolute* time after the beam of the cathode ray tube has started to sweep may be different. However, the *relative* time after the beam has passed the indicia 206 that it starts to record the spots 204 will be independent of the lateral position of the film in the gate. Thus, by the use of the indicia 206 as a reference position of the beam, or a relative time of crossing by the beam, the pattern or spots 204 can be recorded in their true relative columnar position.

In order to know when the indicia 206 are crossed by the beam, it is important to give the pattern of pulses generated by this crossing **206*a*', 206*b*' a distinctive pattern. Thus, a single pulse might be generated by a blemish or spot accidentally placed on the strip, and if this pulse started the clock and the generation of spikes 221, it is obvious that the spikes might very well be out of synchronism with the traverse of the beam, etc. This characteristic pattern can be made up of a combination of narrow and/or wide lines and spaces, etc. This pattern would be recognized as a distinctive pattern of spots or pulses in the pattern recognition comparator 215, and if it agreed with the preselected pattern, say 206*a*', 217, 206*b*', the comparator 215 would signal the clock 216 to start, and would generate repetitive signals which would be formed into appropriate spikes of voltage in the pulse generator 217, which are then applied to the beam brightening electrode over lead 218**, as is well known in the art.

In FIG. 11, I have shown in schematic form the features of a new type of scanner of digital spots packed at high density and adapted, in scanning to be controlled by longitudinal and transverse control indicia. The type of circuit operations of beam sweep and brightening, pattern comparison, clock starting, counting, and pulse generation required in the operation of my scanner are all well known in the art, particularly the relatively new and voluminous art of electronic data processing and computing machines. There are many published articles and books that cover this art any many commercial equipments that utilize these circuit operations. This art taken in conjunction with my patents U.S. No. 2,820,907; 3,158,-846; 3,179,001; 3,322,030; 3,322,033 and 3,423,743, provides all the information needed for the man skilled in the art to practice this invention.

In FIG. 12 is shown schematically another type of digital microfilm recorder utilizing conventional D'Arsonval galvanometers as the recording light sources. The light source 220 (which can be a conventional lamp, or an ultraviolet light source) is supplied over leads 221. The optics 222 focuses the lamp onto the face of the mask 224 after reflection from the mirrors **223, 223*a*, 223*b*, etc., on the galvanometers. The nominal position of the spot images of the lamp are adjacent to a multiplicity of small openings 225, 225*a*, 225*b***, etc., in the mask.

By applying voltage pulses to the leads **234, 234*a*, 234*b*, etc., respectively, of the galvanometers, the mirrors can be made to turn and place the spot images over the openings 225, where the light falls on the optics 231, and is focussed again on the phtographic film strip 232. The movement 233 of the strip 232 is synchronized with the signals to the galvanometers so that a continuing pattern of spots 235 and indicia 236** are recorded.

In FIG. 7, I show a three part assembly comprising two layers of clear plastic strips acting as a support for an intermediate layer of Kalvar emulsion. This type of assembly is ideal for use in my microfilm storage system because the Kalvar emulsion can be completely sealed and protected by plastic layers 160 and 161 at the factory.

There is another type of photographically sensitive material that can be used in the assembly of FIG. 7. This involves the use in the intermediate layer of photochromic compounds. These are chemicals which exhibit reversible spectral absorption effects, such as color changes, resulting from exposure to radiant energy in the visible or near visible portion of the spectrum. For example, one class of photochromic materials consists of light sensitive organic dyes. Photochromic coatings can be made of a molecular dispersion of these dyes in a suitable coating material. These photochromic coatings are similar to photographic emulsions in appearance and other properties. They are completely grain free, have high resolution and can be used for very high reduction ratio recording, as high as 200/1. This makes them ideal for applications to my invention since the packing density is correspondingly high. The information becomes immediately visible on exposure, and can be erased and rewritten repeatedly. Recording is accomplished by use of ultraviolet light and erasing by using either heat or visible light of the proper wavelength. This art is reported in the technical press in many articles including: Beman, E., Fox, E. R., and Thompson, R. D. Photochromic Spiropyrans, Jl. Am. Chem. Soc. 81, Part 4, November 1959, pp. 5605–5608, and Carlson, C. O., Grafton, D. A., and Tauber, A. S. The Photochromic Micro Image Memory. ONR Symposium on Large Capacity Memory Systems, Washington, D.C., May 1961.

I therefore contemplate in this embodiment of my invention, the use of photochromic coatings as an additional type of photosensitive material in addition to the other materials discussed above. The same type of ultraviolet light sources contemplated for use with Kalvar can, of course, be used with photochromic coatings.

In FIGS. 6 and 10 of my U.S. Pat. No. 3,179,001, I show the use of a camera apparatus for taking a picture of the information in the film gate of the traversing apparatus. No special type of camera is required for this purpose. In fact, the type of camera that is used will depend on the use to which the pictures will be put. In connection with this present invention I wish to point out a particular type of camera that can be used with special benefits.

Both the Kalvar and photochromic materials have no grain and thus high resolution. They can be used to record information with a very high ratio of optical reduction. Thus, they make ideal recording materials for use in my information systems. Of course, in the optical imaging of this type of record to a camera or scanner, with a high ratio of magnification it is important to keep the spacing between the record strip and object lens very precise. This may be difficult to do at the high rate of traverse of the record strip contemplated in the scanning of my record strip. Thus, while it is very desirable to use the extreme photographic reduction, so far as storage goes, this very high ratio introduces great difficulties in the scanning process. I therefore contemplate the readout from the original very high ratio record in two steps: The first step is to copy the original very high ratio record strip onto a second record strip at a nominal magnification of say 2–8 times. This magnification does not require the precise optics that would be required to magnify in the full ratio of say 200/1. The copy can be made on Kalvar film, or preferably on photochromic film, since both of these require simple exposure and development. The photochromic film is to be preferred since it can be erased and reused. However, any type of photographic material can be used.

Consider the case where a large volume of information is to be read out of storage for transmission by communication link. The very high ratio record strip in the storage is photographed at nominal magnification ratio to a photochromic film strip. The photochromic strip has the image immediately visible and the film copy which is now a medium ratio record strip can then be run into a high speed photoelectric scanner for reading and transmission.

Thus, instead of slowing down the original very high ratio record so it can be scanned photoelectrically at very high magnification ratio, or conversely, scanned at high speed at the cost of a very complicated and expensive optical system, I contemplate breaking down the high magnification ratio scanning step into two steps, each of moderate optical magnification ratio, which can both be handled at high traverse speed and simple optics. The first step is to copy to an immediately developed photochromic record strip that can be run directly and continuously to a photoelectric scanner. This temporary photochromic record can then be used to make permanent film copy by contact printing, if desired, or can be erased and reused in this process.

Since heat will cause erasure of the photochromic image, it will be necessary to refrigerate the storage system to a temperature, preferably of 0° C. to maintain the records in original photographic condition. This should offer no difficulty since the entire mechanism is automatic, can be handled without manual help, and can thus be sealed into a closed chamber.

In FIG. 3, I show as part of the central scanner assembly, a recording device 76. The purpose of this recorder was to add information as desired to update the records. With Kalvar film, by leaving appropriate clear spaces on the record, the information can be added to. By the use of photochromic film, the record can, in addition, be erased and added to. Thus, I contemplate that the recorder 176 in FIG. 3 will include means to irradiate the record strip in the film gate with the proper light so as to erase the record prior to recording. This step is well known in the art.

It will be clear that the separate areas 101, 102, 108, etc., of the record strip shown in FIG. 4 can be recorded at separate times, particularly if they are to be scanned with separate scanners. In the area 108, for example, where large volumes of digital information are stored, it is important to use the highest possible optical reduction or packing density. (This, of course, requires the use of control indicia for scanning.) This very high density requires (as outlined above) special means for handling readout. The extra cost or complication is justified by the higher density of storage, and where large volumes of data are involved, the complication can be justified. However, this very high ratio recording need not apply to the indexing patterns, such as the subject index or the section index. These can still be printed on the strip in nominal reduction ratios, and their scanning can be done at high speed with simple scanning equipment.

Since it is desirable to scan the index at very high rate, and since there are only small volumes of index bits to be scanned, I contemplate using a storage density for these indexes such that they can be scanned with the use of control indicia at the highest tape speed. Then when the desired section or address is found, the information stored at very high ratio reduction can be scanned in the two step process described above.

It will be clear that in recording the information at very high ratio photographic recording, the recording process can also be carried out in two steps. For example, a first record strip can be prepared at nominal photographic reduction ratio by any of the procedures described in the specification above. Then this record at nominal ratio can be used in a recorder, such as that shown in FIG. 10, with this first step nominal ratio record used as strip 180. In other words, a photographic copying system is used, with ultraviolet light irradiation, to a reduced dimension image on the final record film 185.

To recapitulate, the basic concept of my invention is illustrated by the schematic system shown. This is an enlarged and augmented system of the type illustrated and described in my patents U.S. No. 3,179,001 and No. 3,423,743. It comprises in combination a plurality of reels of digital and pictorial film 57 adapted to be run separately, selectively and sequentially through film gates such as illustrated in FIGS. 1 and 2.

The film strips might be of the types illustrated in FIG. 4 having section indicia such as 101, address indicia such as 102 and information digital data such as in 108, 109, 110, etc. Spaces are left, such as 111, where data can be recorded at a later time with corresponding address indicia 114, 115. Photographic facsimiles 117 may be recorded on the film strips which can be copied by photographic camera means 77 for example.

Means are provided for reading the section index indicia, such as 66, which are preferably associated with each of the film gates 58. Since the digital section indicia are of a relatively large size, they can be read by relatively simple apparatus such as 27, 28, 29 of FIG. 1 of my patent U.S. No. 3,423,743 while the strip is in rapid motion. While the strip is moving the section indicia are being read by 66 and compared with the desired section number. When agreement is reached, the index control unit stops the film drive, at the beginning of the section of interest. The manner in which the strips can be controlled in accordance with the section index is well known in the art. Also, reference is made to my patent U.S. No. 3,179,001.

Next the subject index scanner 78 is rotated to the desired column 102 of the proper film gate 57 and the film strip started. The addresses read by 78 are transmitted by 92 to the central control unit 50 where the addresses read are compared to the desired address. When this is found the film is stopped at the proper address. While the address index scanner 78 could be placed like 66 in association with each of the film gates, because the address indicia are generally of larger numbers of bits than the section indicia, it may be desirable to use a more complicated scanner, use only one, and place it at the central scanning position 78.

Next, as soon as the central scanner 59 is finished reading information in one of the gates, it is switched over to the gate in which the film has just been positioned to the desired address. The film is started and scanner 59 reads the data and transmits it by 71 to the C.C.U.

To record the facsimiles 117, a camera 77 is provided. This type of device is fully described in my patent U.S. No. 3,179,001. It is seen from FIG. 6 of that patent that both the information scanner A and the camera B, are mounted for rotation about the same vertical axis 28, placed one above the other. Thus, following that design each of the four devices, information scanner 59, address scanner 78, recorder 76 and camera 77 would be mounted for rotation about the same vertical axis, but positioned one above the other. Each could turn independently to any of the film gates, but would see its portion or column of the film strip displaced proportionately along the strip.

This general type of centrally controlled information system is described in detail in my patent U.S. No. 3,423,743. Since all of the details of interconnections and controls are well known in the art, to which reference is made at a number of points, and many parts of which are fully described in one or more of my patents U.S. No. 2,820,907; 3,158,846; 3,179,001; 3,322,030; 3,322,033 and 3,423,743, it is not felt necessary to provide further details in this application.

I have described my invention in terms of a number of specific embodiments, and have described a number of changes and variations. There are many more modifications and alterations in the details of construction and method of operation that will become apparent to the man skilled in the art from a reading of the foregoing description of the present invention, and such modifications and alterations may be made without departing from the spirit and scope of the invention.

I claim:

1. An information storage and retrieval system comprising,
(a) a plurality of information records, each record in the form of a strip medium, at least part of the information on each of said strips being in digital form arranged in a pattern of spots in at least one array of spots,
(b) section index means on each of said strips marking a multiplicity of predetermined sections on each of said strips,
(c) means for running a multiplicity of said strips independently and simultaneously through a multiplicity of strip handling means, at least one strip in each of said strip handling means,
(d) means associated with each of said strip handling means to detect said section index means and to drive and position said strips to desired sections in each of said strip handling means,
(e) subject index means on each of said strips identifying the particular items of information along said strips,
(f) first central scanning means for reading said information spot patterns on said strip record,
(g) second central scanning means for reading and subject index means on said strip records, and
(h) means for placing said first and said second central scanning means in operating relation selectively and successively with each of said strip handling means.

2. Apparatus as in claim 1 including means to make a replica of at least part of the information on said record, and means to place said replica making means in operating relation selectively and successively with each of said strip handling means.

3. Apparatus as in claim 2 in which said replica is a photographic record.

4. Apparatus as in claim 2 in which said replica is a strip record.

5. Apparatus as in claim 2 in which said information includes photographic microfacsimiles and said replica includes said photographic microfacsimiles.

6. Apparatus as in claim 2, in which said replica is a replica of the information first spot patterns on said record medium.

7. Apparatus as in claim 6 in which the density of spots in said information pattern on said record is D spots per unit area, and the density of spots in said information pattern on said replica is *d* spots per unit area, where *d/D* is a minor fraction.

8. Apparatus as in claim 7 in which said ratio *d/D* is less than ¼.

9. Apparatus as in claim 6 including means to scan said replica to read said information thereon.

10. An information storage and retrieval system comprising,
(a) a multiplicity of record members adapted to be run independently and simultaneously through a multiplicity of strip handling means at least one record member in each strip handling means, each record member including
(1) a strip medium,
(2) the information on said medium represented at least in part by a first pattern of spots of detectable physico-chemical properties, said spots arranged in at least one array of spots,
(3) section index means on said record to mark the positions of a plurality of sections along said strip,
(4) subject index means comprising a second pattern of spots identifying the particular items of information and placed on said strip in geometric relation to the position of the particular items of information, (b) a plurality of strip handling means each adapted to store, drive and position at least one strip record member to a predetermined section, (c) first central scanning means for reading said information first spot patterns, (d) second cenrtal scanning means for reading said subject index means second spot patterns and for positioning said strips to predetermined subjects in said strip handling means, and (e) means for placing said first and said second central scanning means in operating relation selectively and successively with each of said strip handling means.

11. Apparatus as in claim 10 including means to separately and independently place said first and said second central scanning means in operating relation with different strip handling means.

12. Apparatus as in claim 10 including guide indicia recorded on said record medium in precise geometric relation to said information first pattern of spots and means responsive to said guide indicia for reading said information first pattern of spots.

13. Apparatus as in claim 10 in which said record medium comprises a radiation sensitive medium.

14. Apparatus as in claim 13 in which said radiation sensitive medium is sensitive to ultraviolet light.

15. Apparatus as in claim 13 in which said radiation sensitive medium is photochromic in nature.

16. Apparatus as in claim 10 in which the density of spots in the information first pattern of spots is greater than the density of spots in the subject index means second pattern of spots.

17. Apparatus as in claim 10 in which said strip medium comprises a three-ply strip comprising an upper and lower clear plastic film with an intermediate layer of radiation sensitive material of the class of Kalvar and photochromic materials.

18. Apparatus as in claim 10 in which said record medium comprises a strip of clear plastic film covered with a thin layer of material opaque to radiation, which layer has been removed in spots to form the information pattern, said layer adapted to be removed by heating means.

19. Apparatus as in claim 10 in which said information pattern of posts, said subject index means pattern of spots, and said section index means each occupy separate transversely adjacent spaces along said strips.

20. Apparatus as in claim 10 in which said first and said second central scanning means comprises electro-optical scanning means.

21. Apparatus as in claim 20 in which said first central scanning means comprises a flying spot scanning means.

22. Apparatus as in claim 10 in which said first central scanning means comprises (1) a cathode ray tube with means for sweeping the cathode ray beam across the face of said tube, (2) first control means to initiate said sweep and control its speed of traverse, (3) second control means to increase the beam current to provide a bright spot of light at the point of impact of said beam on said face, (4) first optical means to project an image of said lighted sweep path on said face onto said strip, (5) means to traverse said strip past said first optical means, (6) second optical means to project an image of said illuminated strip onto a photoelectric detector, (7) circuit means responsive to the signal output of said detector, to recognize the characteristic pattern arising from the sweeping of said beam image across said indicia, and (8) means responsive to said circuit means for generating a uniform series of equally time-spaced electrical pulses to be applied to said second control means, whereby said beam will be brightened at times corresponding to the position of spots in said pattern in precise relation to the position of said indicia, irrespective of the lateral movement of said strip.

23. In an information system which includes a plurality of strip handling means, each strip handling means adapted to store, drive and position at least one strip record, each record including at least one pattern of spots of recognizable character on said strip representing said information, subject index means representative of said information, section index means, each strip handling means having section index detecting means and control means responsive thereto to position said strip to a desired section, first and second central scanning means for reading respectively said information; and said subject index means, first and second positioning means for independently and simultaneously placing said first and said second central scanning means selectively and successively in operating relation with each of said strip handling means, the method of searching said information system comprising, (a) in a first strip handling means positioning a first strip to a predetermined first section, (b) positioning said second central scanning means in operating relation to said first strip handling means, (c) traversing said first strip in said first strip handling means while searching for a desired subject index, and (d) simultaneously positioning a second strip in a second strip handling means to a predetermined second section.

24. The method of claim 23 including the additional steps of, when said first strip in said first strip handling means is positioned to the predetermined subject index and said second strip in said second strip handling means has been positioned to a predetermined section, positioning said first central scanning means to said first strip handling means and reading said information, while simultaneously positioning said second central scanning means to said second strip handling means to scan said second strip for a predetermined subject index.

25. The method of claim 23 including the additional step of simultaneously copying a third strip in a third strip handling means.

26. The method of rapid retrieval of information in a storage system in which the information is stored on strips in the form of patterns of spots, the patterns comprising the information stored, said strips adapted to be traversed selectively through a multiplicity of strip transport units with optical gates, said gates in precise geometric relation to an optical scanner adapted to be directed selectively to each of the gates to read the information on the strips therein, and also selectively, independently, and simultaneously to scan a separate subject index on said strip, the steps of:

(1) printing said information on said strips within an area of said strip comprising less than the total width of said strip, (2) printing said subject index on said strip in an adjacent non-overlapping area of said strip, (3) traversing said strips through said gates, (4) scanning said subject index of a first strip for a preselected index pattern until said index pattern is found, (5) scanning the information related to said index pattern of said first strip, while (6) simultaneously scanning the index pattern of a second strip.

27. In an information storage and retrieval system in which the information is stored as patterns of spots on a record medium the method of operation, comprising, the steps of recording said information at ultra high density of storage on said record medium, recording the index patterns used to locate said information on said record medium at nominal density of storage whereby said index patterns can be read while said record medium is traversed at high speed, photographically copying said information from said record medium to a second medium at nominal optical magnification at high speed of traverse, whereby said information on said second medium will be at nominal density of storage, and scanning said second medium at high speed of traverse to read said information.

28. In an information storage and retrieval system in which the information is stored on the record strip as micro-images of optical patterns at a very high ratio of optical reduction, the improvement in the method of retrieval of said information from said record strip while traversing said record strip at high speed, comprising the steps of: photographically copying the micro-images of information from said record strip to a second strip at a nominal ratio of magnification, and scanning said second strip at high speed of traverse to read the enlarged images of information recorded thereon.

29. In an information storage and retrieval system in which said information comprises microimages of optical patterns said information recorded at very high ratio optical reduction, the improvement in readout means comprising: means for photographing said record strip at nominal optical magnification onto a second record strip at high speed of traverse and means for scanning said second record strip at high speed of traverse to read said information.

References Cited

UNITED STATES PATENTS

| | | | |
|---|---|---|---|
| 2,610,791 | 9/1952 | Auakian | 235—61.9 |
| 2,652,196 | 9/1953 | Sterling | 235—61.9 |
| 2,918,656 | 12/1959 | Nolde et al. | |
| 3,024,989 | 3/1962 | Papo et al. | 235—61.7 X |
| 3,065,905 | 11/1962 | Stern | 235—61.11 |
| 3,121,159 | 2/1964 | Rogal | 235—61.9 X |
| 3,191,006 | 6/1965 | Auakian | 235—61.7 |

DARYL W. COOK, Primary Examiner

U.S. Cl. X.R.

340—172.5